US009877084B2

(12) United States Patent
Hao et al.

(10) Patent No.: US 9,877,084 B2
(45) Date of Patent: Jan. 23, 2018

(54) TAGGING AND SHARING MEDIA CONTENT CLIPS WITH DYNAMIC AD INSERTION

(71) Applicant: Verizon Patent and Licensing Inc., Arlington, VA (US)

(72) Inventors: Jianxiu Hao, Acton, MA (US); Jian Huang, Sudbury, MA (US); Sanjay Ahuja, Irving, TX (US); John K. Trimper, Groton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 135 days.

(21) Appl. No.: 14/632,439

(22) Filed: Feb. 26, 2015

(65) Prior Publication Data

US 2016/0255414 A1 Sep. 1, 2016

(51) Int. Cl.
| | |
|---|---|
| *H04N 21/81* | (2011.01) |
| *G06Q 30/02* | (2012.01) |
| *G06Q 50/00* | (2012.01) |
| *H04N 21/435* | (2011.01) |
| *H04N 21/235* | (2011.01) |
| *H04N 21/4788* | (2011.01) |
| *H04N 21/414* | (2011.01) |
| *H04N 21/845* | (2011.01) |
| *G11B 27/034* | (2006.01) |
| *H04N 21/8549* | (2011.01) |

(52) U.S. Cl.
CPC ....... *H04N 21/812* (2013.01); *G06Q 30/0241* (2013.01); *G06Q 50/01* (2013.01); *G11B 27/034* (2013.01); *H04N 21/235* (2013.01); *H04N 21/41407* (2013.01); *H04N 21/435* (2013.01); *H04N 21/4788* (2013.01); *H04N 21/8456* (2013.01); *H04N 21/8549* (2013.01)

(58) Field of Classification Search
CPC .......... H04N 21/23424; H04N 5/2723; H04N 21/814; H04N 21/258; H04N 21/25883; H04N 21/2668
See application file for complete search history.

(56) References Cited

U.S. PATENT DOCUMENTS

| | | | |
|---|---|---|---|
| 6,698,020 B1 * | 2/2004 | Zigmond | H04N 5/44513 348/E5.102 |
| 2007/0180488 A1 * | 8/2007 | Walter | H04N 5/783 725/135 |

(Continued)

*Primary Examiner* — Benjamin R Bruckart
*Assistant Examiner* — Anthony Bantamoi

(57) ABSTRACT

A system may receive tag information, associated with media content, that includes a tag and a tag time. The system may generate, based on the tag information, clip information that includes a start time and an end time for a media content clip associated with the media content. The system may determine, based on the tag information, advertisement information that identifies an advertisement to be displayed with the media content clip, and indicates how the advertisement is to be displayed. The system may provide the tag information for display via a social media application, and may receive, via the social media application, an indication that the media content clip is to be provided for display to a user. The system may provide the advertisement information and the clip information such that the advertisement and the media content clip are provided for display to the user based on the advertisement information.

20 Claims, 11 Drawing Sheets

(56) References Cited

U.S. PATENT DOCUMENTS

| | | | | |
|---|---|---|---|---|
| 2009/0092374 A1* | 4/2009 | Kulas | ................ | H04N 7/173 |
| | | | | 386/248 |
| 2009/0199230 A1* | 8/2009 | Kumar | ............... | G06Q 30/02 |
| | | | | 725/32 |
| 2009/0249222 A1* | 10/2009 | Schmidt | ............ | H04N 21/2368 |
| | | | | 715/751 |
| 2012/0096357 A1* | 4/2012 | Folgner | ............... | G11B 27/34 |
| | | | | 715/726 |

* cited by examiner

TAGGING AND SHARING MEDIA CONTENT CLIPS WITH DYNAMIC AD INSERTION

BACKGROUND

A media content application, hosted by a user device (e.g., a smart phone, a tablet), may allow a user device to play, to a user, media content (e.g., a television program, a video, a movie, etc.) selected by the user. In some cases, the user device may also play an advertisement with the media content (e.g., before the user device plays the media content, at an advertisement break during the play of the media content, etc.).

DETAILED DESCRIPTION OF PREFERRED EMBODIMENTS

The following detailed description of example implementations refers to the accompanying drawings. The same reference numbers in different drawings may identify the same or similar elements.

A media content application may allow a user device to play media content (e.g., a television program, a video, a movie, etc.) to a user. In some implementations, the user device may also play an advertisement along with the media content (e.g., before the user device plays the media content, at an advertisement break during the play of the media content, etc.). In some cases, the user may wish to provide a tag (e.g., a comment, a rating, etc.) and share a portion of the media content (e.g., a 10 second television program clip, a one minute movie clip, etc.) associated with the tag, via a social media application (e.g., Twitter, Facebook, etc.).

Implementations described herein may allow a user to provide a tag, associated with media content, such that the tag and/or a media content clip (e.g., associated with the tag) may be viewed by other users via a social media application. Moreover, implementations described herein may allow an advertisement to be identified and played with the media content and/or the media content clip based on information associated with the tag (e.g., such that the advertisement may be dynamically identified and played based on the information associated with the tag).

Figure 1A:
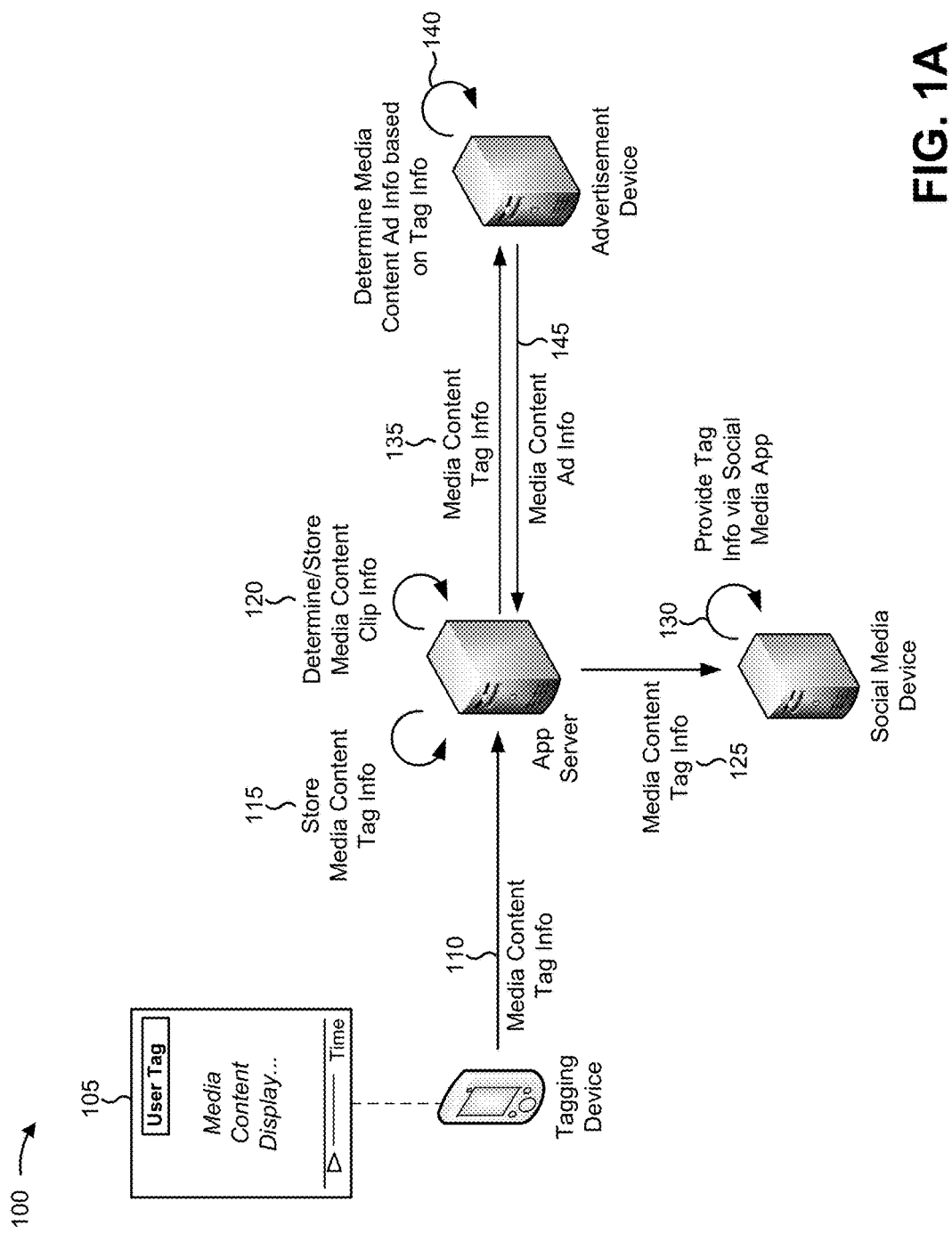
FIGS. 1A and 1B are diagrams of an overview of an example implementation described herein.
Figure 1B:
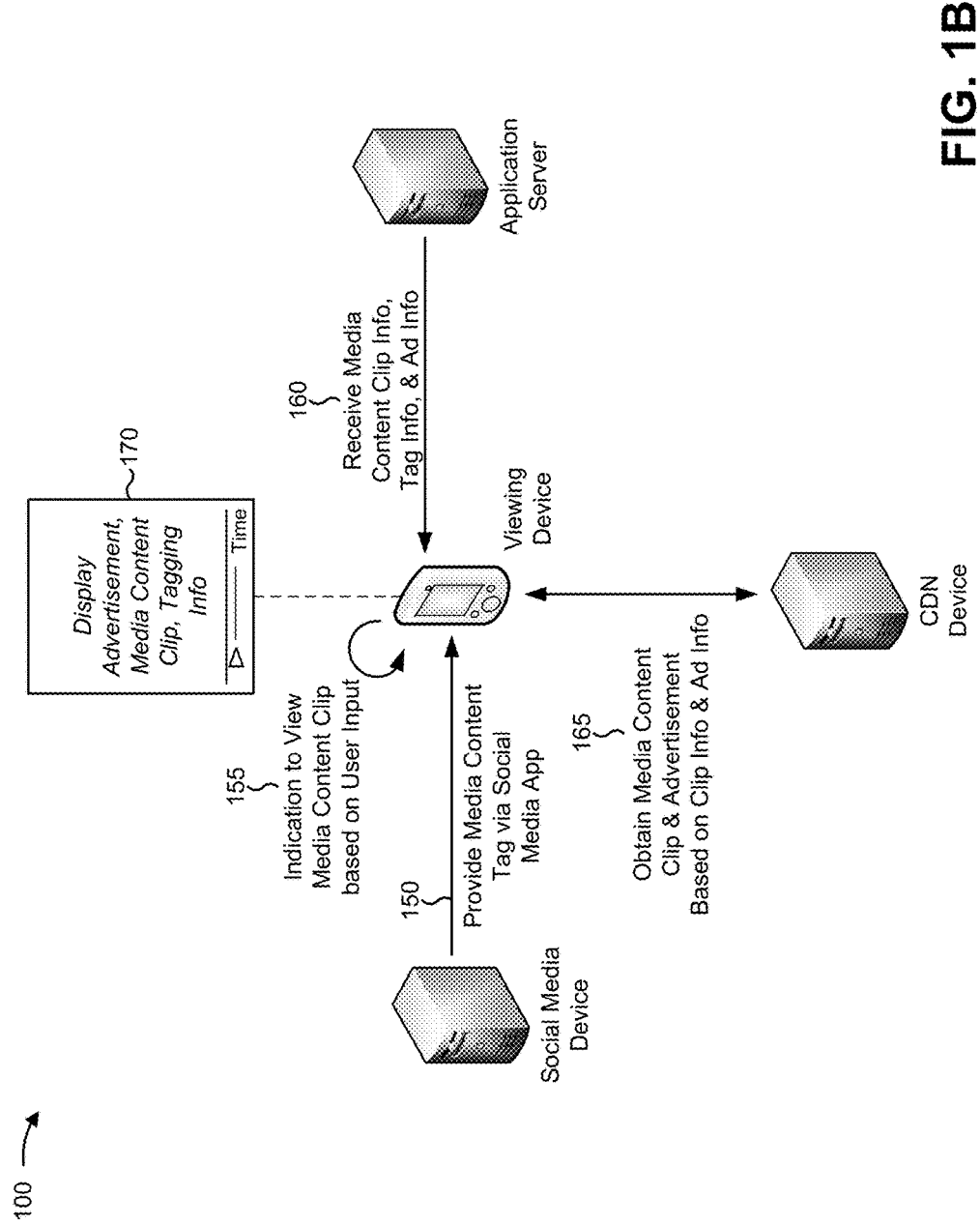

FIGS. 1A and 1B are diagrams of an overview of an example implementation 100 described herein. For the purposes of example implementation 100, assume that a tagging user device (herein referred to as a tagging device) (e.g., a mobile phone, a smart phone, a laptop, etc.) is playing, to a user, media content (e.g., a television program, a movie, a video, etc.) via a media content application. Further, assume that the user wishes to provide a tag (e.g., a comment, a rating, etc.) at a particular time during the play of the media content, and share the tag via a social media application (e.g., such that another user may view the tag and/or a clip of the media content associated with the tag).

As shown in FIG. 1A, and by reference number 105, the user may provide (e.g., by entering text via the tagging device) a tag at the particular time during the play of the media content. As shown by reference number 110, the tagging device may determine (e.g., based on user input, based on information stored or accessible by the tagging device) tag information associated with the tag (e.g., the tag, information that identifies the media content, information that identifies the user, information that identifies a time, within the media content, with which the tag is associated, etc.), and may provide the tag information to an application server associated with the media content application.

As shown by reference number 115, the application server may store the tag information (e.g., for use at a later time) and, as shown by reference number 120, may determine and store clip information that describes a portion of the media content associated with the tag information. As shown by reference number 125, the application server may also provide the tag information to a social media device in order to allow the tag information to be shared via the social media application. As shown by reference number 130, the social media device may provide the tag information via the social media application.

As shown by reference number 135, the application server may also provide the tag information to an advertisement device configured to determine advertisement information, associated with the media content, based on the tag information. As shown by reference number 140, the advertisement device may receive the tag information, and may determine advertisement information associated with the media content and/or the media content clip (e.g., information that identifies an advertisement that is to be played with the media content and/or the media content clip, information indicating a manner in which that advertisement is to be played with the media content and/or the media content clip, etc.). As shown by reference number 145, the advertisement device may provide the advertisement information, associated with the media content, to the application server (e.g., such that the application server may provide the advertisement information to one or more viewing devices at a later time).

For the purposes of FIG. 1B, assume that a viewing device has requested information (e.g., to be displayed in a news feed), associated with the social media application, for display via the social media application. As shown by reference number 150, the social media device may provide the tag information associated with the media content (e.g., along with other information associated with the social media application that is to be displayed via the news feed). As shown by reference number 155, the viewing device may receive (e.g., based on the user selecting a link associated with the tag information) an indication that the viewing device is to play the media content clip associated with the tag information. As shown by reference number 160, the viewing device may determine based on information provided by the application server, tag information, associated with the media content clip (e.g., including the tag information provided by the tagging device and/or tag information provided by other tagging devices and associated with the media content clip), and the advertisement information associated with the media content. As shown by reference number 165, the viewing device may then obtain, from the CDN device, the media content clip (e.g., described by the clip information) and the advertisement (e.g., identified by the advertisement information). As shown by reference number 170, the viewing device may play the advertisement, the media content clip, and the tag information, accordingly (e.g., such that the advertisement is played with the media content clip and tags, associated with the tag information, are played during the media content clip).

In this way, a user may provide (e.g., via a tagging device) a tag, associated with media content, such that the tag and/or a media content clip (e.g., associated with the tag) may be viewed by other users (e.g., via respective viewing devices) via a social media application. Additionally, an advertisement may be identified and played with the media content and/or the media content clip based on information associated with the tag (e.g., such that the advertisement may be dynamically identified and played based on the information associated with the tag). While processes and/or methods described herein are described in the context of media content in the form of video (e.g., a movie, a television program, etc.), in some implementations, these processes and/or methods may equally apply to another type of media content, such as audio (e.g., an audio program, a song, etc.).

Figure 2:
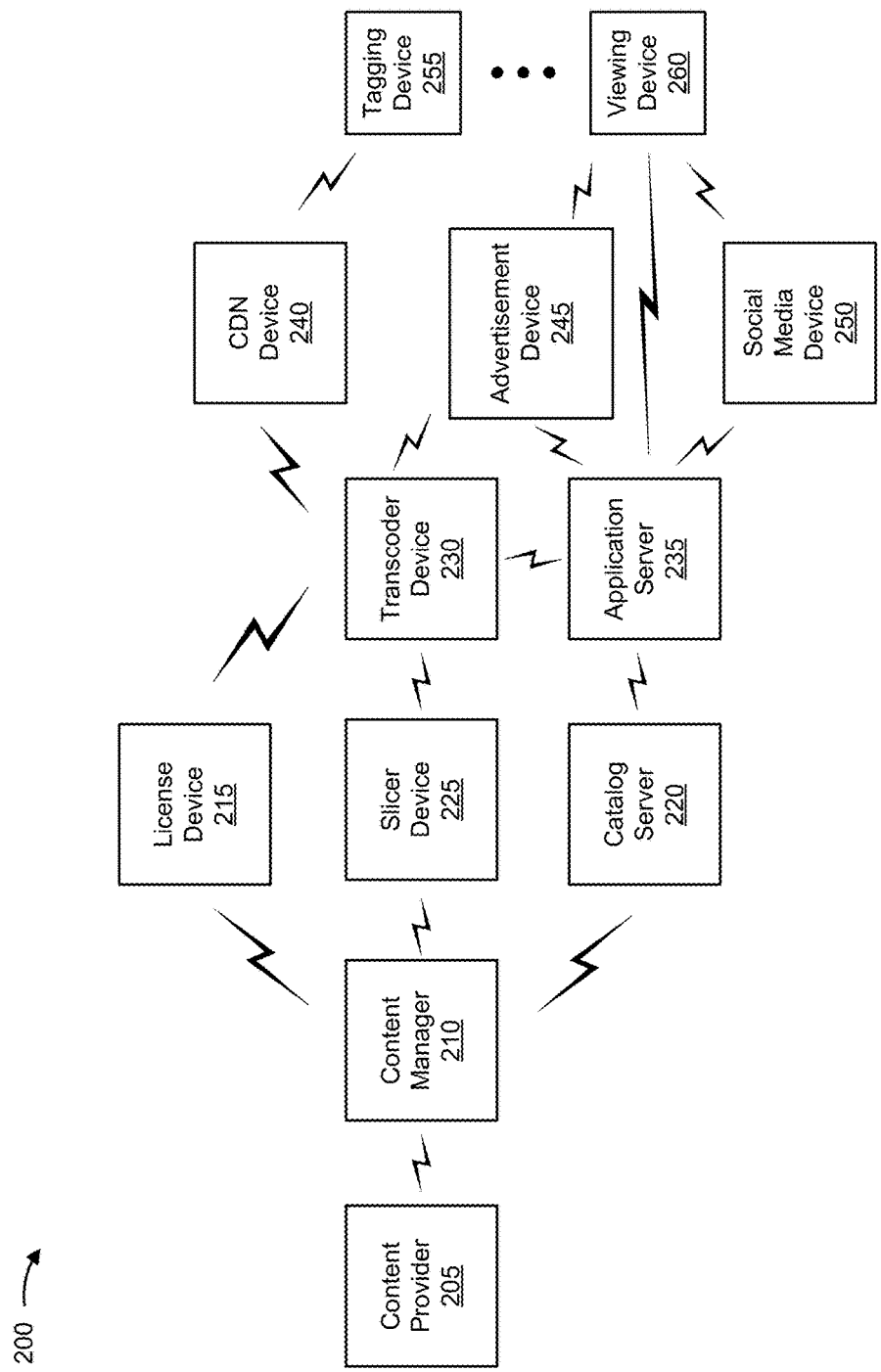
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a content provider 205, a content manager 210, a license device 215, a catalog server 220, a slicer device 225, a transcoder device 230, an application server 235, a content delivery network (CDN) device 240, an advertisement device 245, a social media device 250, a tagging device 255, and a viewing device 260. Devices of environment 200 may interconnect via wired connections, wireless connections, or a combination of wired and wireless connections.

Content provider 205 may include one or more devices capable of providing media content that is to be provided (e.g., to tagging device 255 or viewing device 260) via CDN device 240 and/or a media content application. For example, content provider device 205 may include a computing device, such as a server device or a group of server devices. In some implementations, content provider device 205 may be associated with a producer, an owner, and/or a distributor of media content. In some implementations, content provider device 205 may provide the media content to content manager 210.

Content manager 210 may include one or more devices capable of receiving, storing, processing, managing, and/or providing media content and/or information associated with the media content received from content provider 205. For example, content manager 210 may include a computing device, such as a server device or a group of server devices. In some implementations, content manager 210 may receive media content, may determine metadata information associated with the media content (e.g., a name of the media content, a media content identifier associated with the media content, a description of the media content, advertisement break information associated with the media content, a storage location of the media content, etc.) and/or license information associated with the media content (e.g., an encryption key, etc.). In some implementations, content manager 210 may receive information from and/or transmit information to another device in environment 200.

License device 215 may include one or more devices capable of receiving, generating, storing, processing, and/or providing license information associated with media content. For example, license manager 215 may include a computing device, such as a server device or a group of server devices. In some implementations, license device 215 may be capable of receiving (e.g., from content manager 210) the license information, storing the license information, and/or providing the license information to another device, such as transcoder device 230, tagging device 255, viewing device 260, or the like, when the media content and/or a media content clip, associated with the media content, is to be played.

Catalog server 220 may include one or more devices capable of receiving, generating, storing, processing, and/or providing metadata information associated with media content. For example, catalog server 220 may include a computing device, such as a server device or a group of server devices. In some implementations, catalog server 220 may be capable of receiving (e.g., from content manager 210) the metadata information associated with the media content, storing the metadata information, and/or providing the metadata information to another device, such as application server 235.

Slicer device 225 may include one or more devices capable of slicing media content into media content chunks. For example, slicer device 235 may include a computing device, such as a server device or a group of server devices. In some implementations, slicer device 225 may slice the media content into media content chunks such that the media content chunks may be (e.g., individually) processed by transcoder device 230 and/or provided (e.g., via CDN device 240) to tagging device 255 and/or viewing device 260.

Transcoder device 230 may include one or more devices capable of transcoding and/or encrypting media content. For example, transcoder device 230 may include a computing device, such as a server device or a group of server devices. In some implementations, transcoder device 230 may receive media content (e.g., chunks of media content) and transcode the media content (e.g., into one or more formats). Additionally, or alternatively, transcoder device 230 may receive (e.g., from license server 215) license information associated with the media content and encrypt the media content. Additionally, or alternatively, transcoder may receive metadata information, associated with the media content, and may provide the metadata information to application server 235 (e.g., for storage as being associated with a formatted chunk of the media content). Additionally, or alternatively, transcoder device 230 may receive (e.g., from advertisement device 245) an advertisement (e.g., a video, an image, etc.) and transcode the advertisement into one or more formats.

Application server 235 may include one or more devices capable of receiving, generating, storing, processing, and/ providing media content, and/or information associated with the media content, via a media content application. For example, application server 235 may include a computing device, such as a server device or a group of server devices. In some implementations, application server 235 may be associated with a media content application that allows a user device (e.g., tagging device 255, viewing device 260, etc.) to access and/or play media content. In some implementations, application server 235 may determine and/or store tag information, associated with media content, provided by tagging device 255. In some implementations, application server 235 may store or have access to metadata information associated with the media content, such as information that identifies a storage location of the media content (e.g., a uniform resource locator (URL)), or the like.

CDN device 240 may include one or more devices associated with providing media content and/or advertisement information to tagging device 255 and/or viewing device 260. For example, CDN device 240 may include a computing device, such as a server device or a group of server devices. In some implementations, CDN device 240 may be included in a content delivery network associated with tagging device 255 and/or viewing device 260. In some implementations, CDN device 240 may receive information from and/or transmit information to another device in environment 200.

Advertisement device 245 may include one or more devices capable of receiving, generating, storing, and/or providing an advertisement and/or information associated with the advertisement ("advertisement information"). For example, advertisement device 245 may include a computing device, such as a server device or a group of server devices. In some implementations, advertisement device 245 may be capable of receiving tag information associated with media content and identifying and/or determining an advertisement and/or advertisement information based on the tag information. Additionally, or alternatively, advertisement device 245 may provide the advertisement and/or the advertisement information to CDN device 240 (e.g., such that the advertisement may be provided to tagging device 255 and/or viewing device 260 based on the advertisement information).

Social media device 250 may include one or more devices capable of receiving, generating, processing, storing, and/or providing information via a social media application. For example, social media device 250 may include a server device or a collection of server devices. In some implementations, social media device 250 may be associated with a social media application used by a user of tagging device 255 and/or a user of viewing device 260.

Tagging device 255 may include one or more user devices capable of receiving, generating, storing, processing, and/or providing tag information associated with media content played by tagging device 255. For example, tagging device 255 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, tagging device 255 may receive information from and/or transmit information to another device in environment 200. In some implementations, tagging device 255 may also function as viewing device 260.

Viewing device 260 may include one or more user devices capable of receiving, displaying, playing, and/or providing tag information and/or media content for view by a user. For example, viewing device 260 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, viewing device 260 may be capable of playing a media content clip associated with the tag information. In some implementations, viewing device 260 may receive information from and/or transmit information to another device in environment 200. In some implementations, viewing device 260 may also function as tagging device 255.

The number and arrangement of devices and networks shown in FIG. 2 are provided as an example. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
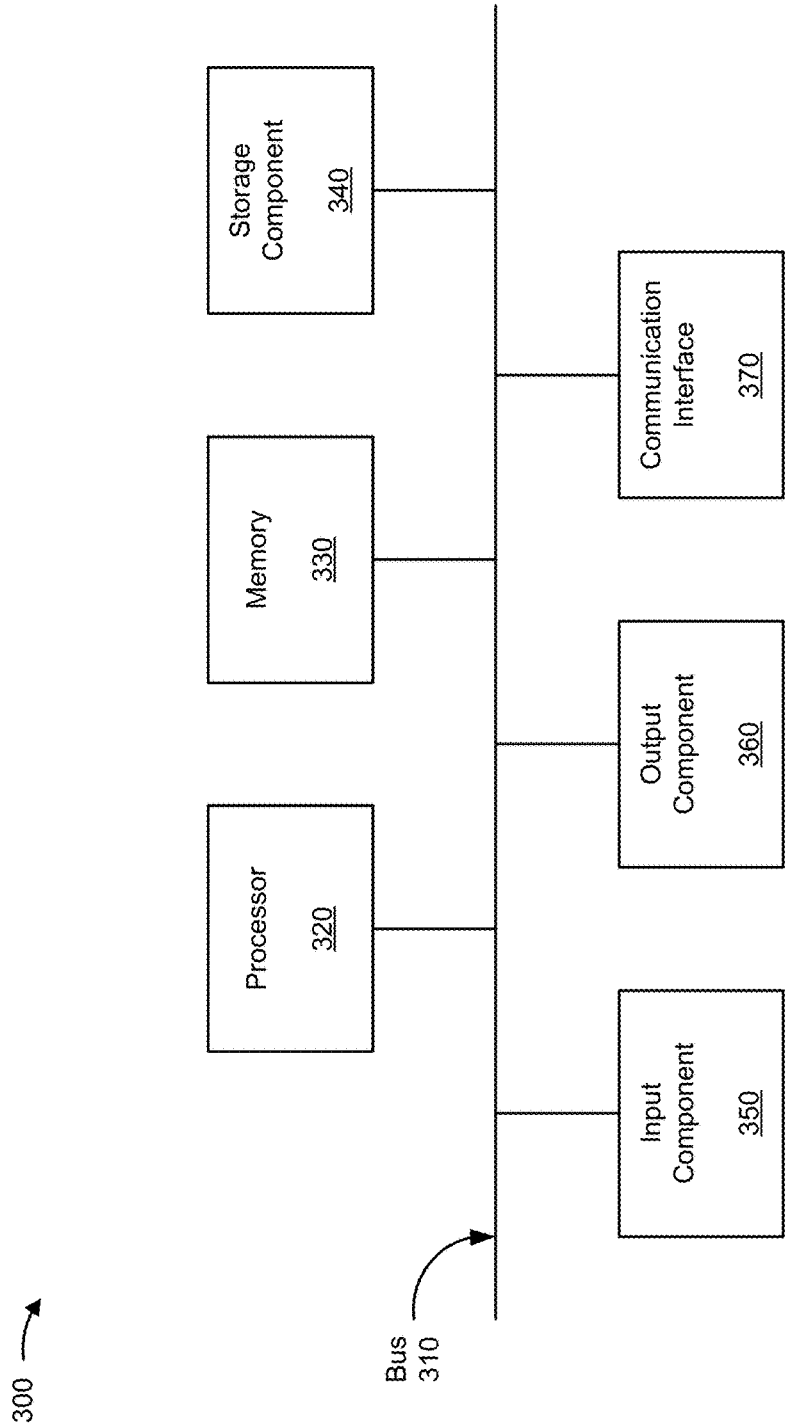
FIG. 3 is a diagram of example components of one or more devices of FIG. 2.

FIG. 3 is a diagram of example components of a device 300. Device 300 may correspond to content provider 205, content manager 210, license device 215, catalog server 220, slicer device 225, transcoder device 230, application server 235, CDN device 240, advertisement device 245, social media device 250, tagging device 255, and/or viewing device 260. In some implementations, content provider 205, content manager 210, license device 215, catalog server 220, slicer device 225, transcoder device 230, application server 235, CDN device 240, advertisement device 245, social media device 250, tagging device 255, and/or viewing device 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
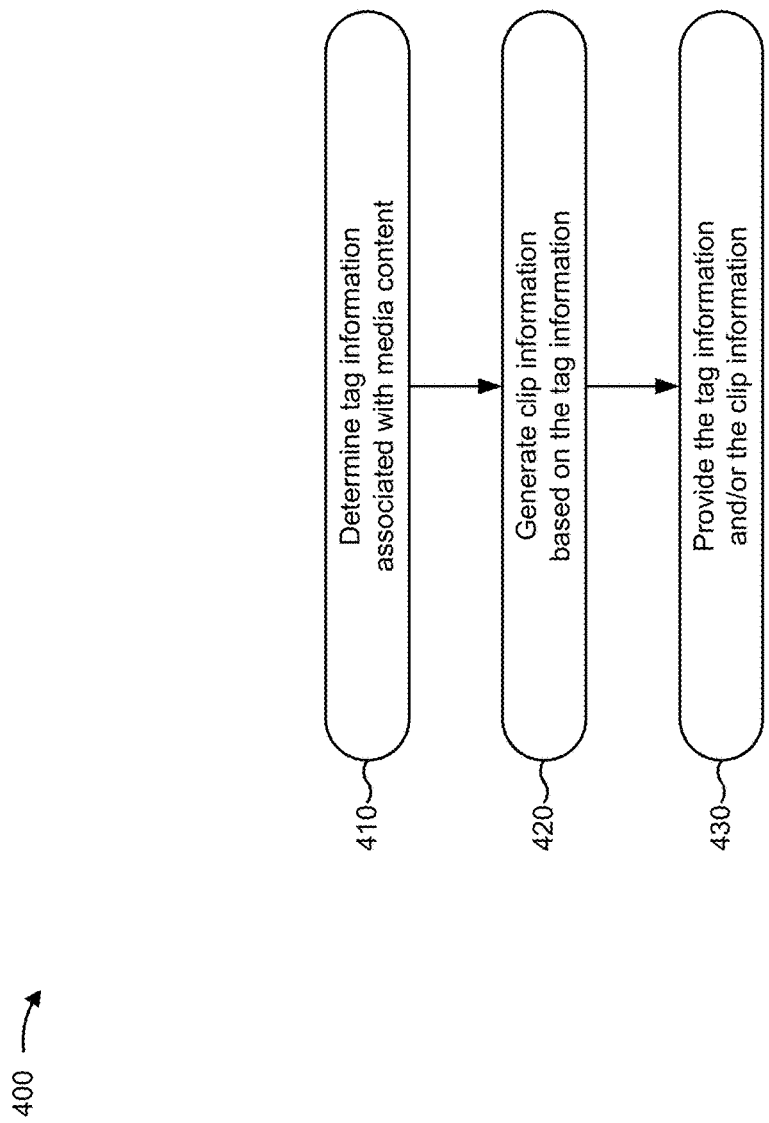
FIG. 4 is a flow chart of an example process for receiving and providing tag information associated with media content.

FIG. 4 is a flow chart of an example process 400 for determining and providing tag information associated with media content. In some implementations, one or more process blocks of FIG. 4 may be performed by application server 235. In some implementations, one or more process blocks of FIG. 4 may be performed by another device or a set of devices separate from or including application server 235, such as one or more other devices included in environment 200.

As shown in FIG. 4, process 400 may include determining tag information associated with media content (block 410). For example, application server 235 may determine tag information associated with media content. In some implementations, application server 235 may determine the tag information when tagging device 255 provides (e.g., based on user input) the tag information. Additionally, or alternatively, application server 235 may determine the tag information when application server 235 receives an indication that application server 235 is to determine the tag information.

Tag information may include information corresponding to a tag associated with media content (e.g., provided for display via a media content application hosted by application server 235). For example, the tag information may include a tag associated with the media content (e.g., a string of characters, a comment, a rating, an emoji, etc.), information that identifies the media content identifier associated with the tag (e.g., a name of the media content, a media content identifier associated with the media content), timing information associated with the tag (e.g., a time during playback of the media content that corresponds to the tag, a date the tag was created, a time of day at which the tag was created, etc.), information associated with a user that created the tag (e.g., a name, an age, a gender, a social media application username, a social media application password, etc.), information that identifies a social media application via which the tag is to be provided (e.g., a name of the social media application, a web address associated with the social media application, etc.), and/or another type of information.

In some implementations, application server 235 may determine the tag information based on information provided by tagging device 255. For example, tagging device 255 may determine (e.g., based on user input via the media content application) that the user wishes to view media content (e.g., a television program, a movie, a video, etc.). Here, application server 235 may provide metadata information, associated with the media content, that allows tagging device 255 to retrieve (e.g., from CDN device 240) the media content.

Tagging device 255 may play the media content for viewing and/or listening by the user. In this example, the user may indicate (e.g., by tapping a touch screen of tagging device 255 during play of the media content) that the user wishes to provide a tag associated with the media content. Tagging device 255 may receive (e.g., based on user input) the tag information and/or may determine (e.g., based on information stored or accessible by tagging device 255) the tag information associated with the media content. In some implementations, tagging device 255 may allow the user to input a user created tag (e.g., via a text box that allows the user to type a comment). Additionally, or alternatively, tagging device 255 may allow the user to select a predefined tag (e.g., via a user selection of a predefined comment from a menu, via a user selection of a rating on a preconfigured rating scale, etc.). Tagging device 255 may then provide (e.g., based on an indication from the user) the tag information to application server 235, and application server 235 may determine the tag information, accordingly. In some implementations, application server 235 may store the tag information such that the tag information may be accessed by and/or provided to another device (e.g., at a later time).

As further shown in FIG. 4, process 400 may include generating clip information based on the tag information (block 420). For example, application server 235 may generate clip information based on the tag information. In some implementations, application server 235 may generate the clip information when application server 235 determines the tag information. Additionally, or alternatively, application server 235 may generate the clip information when application server 235 receives an indication that application server 235 is to generate the clip information.

Clip information may include information that describes a media content clip (e.g., a portion of the media content) associated with the tag information. For example, the clip information may include information that identifies the media content clip (e.g., a media content clip name, a media content clip identifier, etc.), a start time associated with media content clip (e.g., 10 seconds into the media content, 10 seconds before a time associated with the tag, etc.), an end time associated with the media content clip (e.g., 5 minutes before an end of the media content, 50 seconds after a time associated with the tag, etc.), information indicating an association with the tag information (e.g., such that the clip information may be retrieved based on the tag information, as described below), or the like.

In some implementations, application server 235 may generate the clip information based on the tag information. For example, application server 235 may generate the clip information such that a media content clip, described by the clip information, may include a portion of the media content preceding the tag (e.g., 10 seconds before the time associated with the tag, 1 minute before the time associated with the tag, etc.) and a portion of the media content following the tag (e.g., 30 seconds after the time associated with the tag, 1 minute after the time associated with the tag, etc.). In some implementations, application server 235 may generate the clip information such that the clip information describes a media content clip with a default length (e.g., 30 seconds, one minute, two minutes, etc.). Additionally, or alternatively, application server 235 may generate the clip information such that the clip information describes a media content clip with a user defined length (e.g., when tagging device 255 allows the user to identify a length of the media content clip to be generated based on the tag information).

In some implementations, application server 235 may store the clip information such that the clip information may be accessed by and/or provided to another device (e.g., at a later time) in order to allow the media content clip, associated with the tag information and described by the clip information, to be viewed by a user, as described below.

As further shown in FIG. 4, process 400 may include providing the tag information and/or the clip information (block 430). For example, application server 235 may provide the tag information and/or the clip information. In some implementations, application server 235 may provide the tag information and/or the clip information after application server 235 determines the tag information and/or generates the clip information. Additionally, or alternatively, application server 235 may provide the tag information and/or the clip information when application server 235 receives an indication that application server 235 is to provide the tag information and/or the clip information.

In some implementations, application server 235 may provide the tag information to social media device 250 in order to cause the tag information to be displayed via a social media account associated with the user of tagging device 255. For example, application server 235 may determine tag information that includes information associated with a social media application to which the tag information is to be displayed. Here, application server 235 may provide the tag information to social media device 250, and social media device 250 may display the tag information accordingly (e.g., such that other users of the social media application may view the information that identifies the media content, the tag, the information that identifies the user of tagging device 255, the timing information associated with the tag, etc.). In this way, application server 235 may determine (e.g., based on user input) and provide tag information, associated with the media content, such that another user (e.g., a user of viewing device 260) may view the tag information via a social media application and/or view a media content clip associated with the tag information (e.g., based on retrieving the clip information), as described below.

Additionally, or alternatively, application server 235 may provide the tag information and/or the clip information to advertisement device 245 in order to allow advertisement device 245 to store or have access to the tag information and/or the clip information. In some implementations, advertisement device 245 may determine advertisement information based on the tag information and/or the clip information, as described below.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
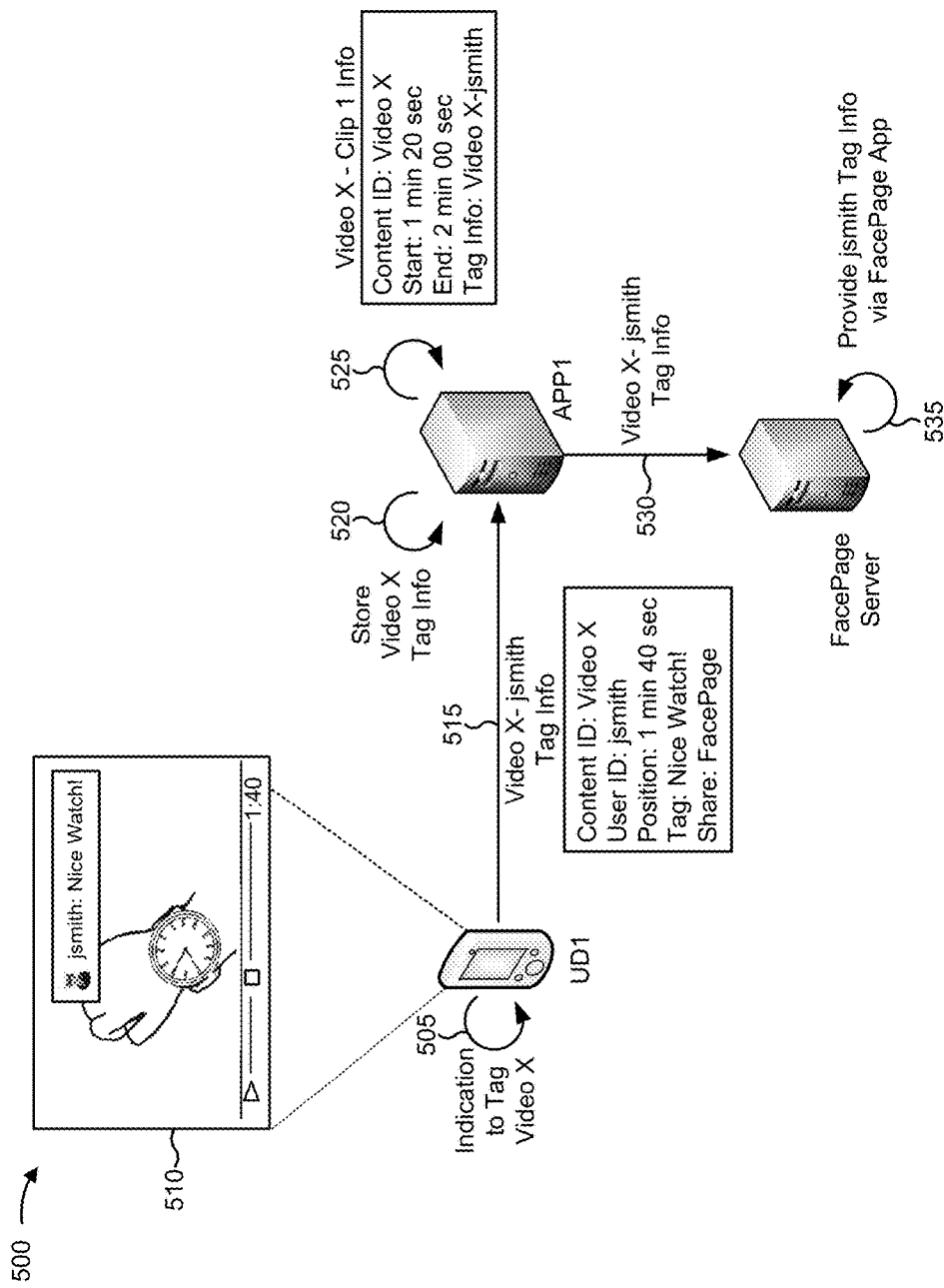
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that tagging device 255 (e.g., UD1) is playing media content (e.g., Video X) via a media content application.

As shown in FIG. 5, and by reference number 505, UD1 may receive, based on a user (e.g., jsmith) tapping a display screen of UD1, an indication that the user wishes to tag Video X at a particular time (e.g., 1:40) during play of Video X. As shown by reference number 510, the user may provide, via UD1, a tag (e.g., "Nice watch!") via an input element (e.g., a text box) displayed via UD1. For the purposes of example implementation 500, assume that, after entering the Video X tag, the user indicates (e.g., via selection of a button) that the Video X tag is to be shared via a social media application (e.g., FacePage). As shown by reference number 515, UD1 may provide tag information, associated with the tag, to application server 235 (e.g., APP1) associated with the media content application. As shown, the tag information may include information that identifies Video X (e.g., Content ID: Video X), information that identifies the user (e.g., User ID: jsmith), timing information associated with the tag (e.g., 1 minute, 40 seconds), the user created tag, and information indicating that the tag information is to be shared via the user's FacPage account (e.g., Share: FacePage).

As shown by reference number 520, APP1 may receive and store the tag information (e.g., such that the tag information may be accessed and/or provided at a later time) and, as shown by reference number 525, may determine clip information based on the tag information. As shown, the clip information may include information that identifies Video X (e.g., Content ID: Video X), a start time associated with a media content clip corresponding to the tag information (e.g., Start: 1 min 20 sec), an end time associated with the media content clip corresponding to the tag information (e.g., End: 2 min 00 sec), and information indicating an association with the tag information (e.g., Tag Info: Video X-jsmith). APP1 may store the clip information for use at a later time (e.g., in order to allow viewing device 260 to view a media content clip described by the clip information, as described below).

As shown by reference number 530, APP1 may provide may also provide the tag information to social media device 250 (e.g., FacePage server) associated with the Facepage application. As shown by reference number 535, the Facepage server may provide the tag information accordingly (e.g., such that other users of the FacePage application may view the tag information). In this way, APP1 may determine, based input provided by a user, tag information and clip information, associated with Video X, such that another user (e.g., a user of viewing device 260) may view the tag information and/or a media content clip, described by the clip information, via the FacePage application.

As indicated above, FIG. 5 is provided merely as an example. Other examples are possible and may differ from what was described with regard to FIG. 5.

Figure 6:
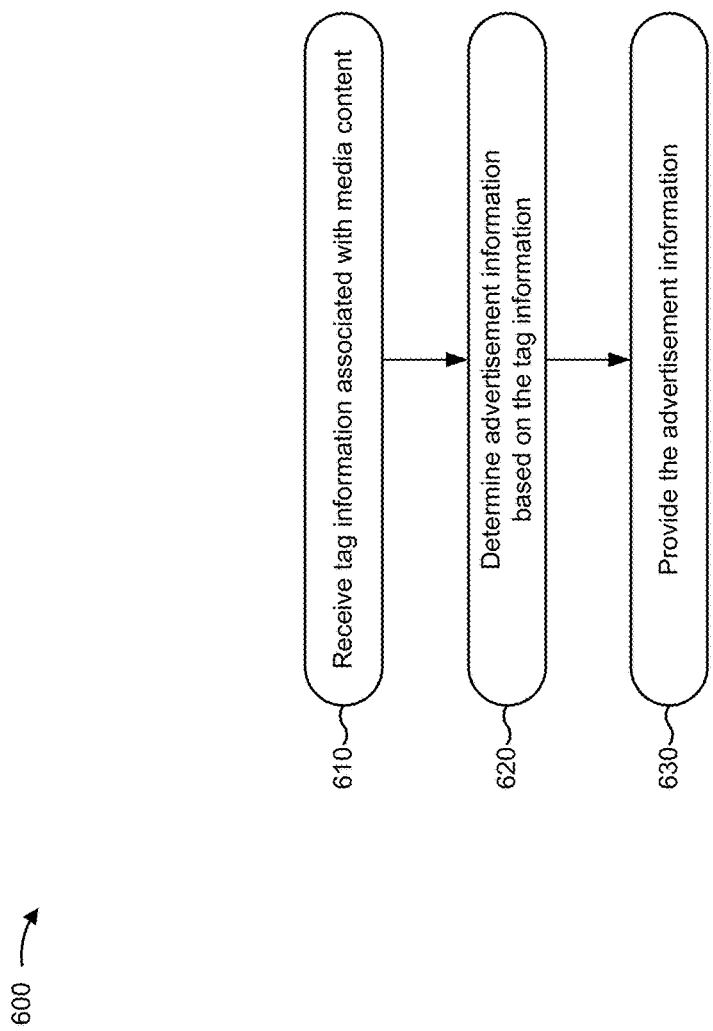
FIG. 6 is a flow chart of an example process for determining advertisement information based on tag information associated with media content.

FIG. 6 is a flow chart of an example process 600 for determining advertisement information based on tag information associated with media content. In some implementations, one or more process blocks of FIG. 6 may be performed by advertisement device 245. In some implementations, one or more process blocks of FIG. 6 may be performed by another device or a set of devices separate from or including ad device 245, such as application server 235 and/or another device included in environment 200.

As shown in FIG. 6, process 600 may include receiving tag information associated with media content (block 610). For example, advertisement device 245 may receive tag information associated with media content. In some implementations, advertisement device 245 may receive the tag information when application server 235 provides the tag information. Additionally, or alternatively, advertisement device 245 may receive the tag information when another device provides the tag information, such as tagging device 255.

In some implementations, advertisement device 245 may receive tag information, associated with the media content, associated with one or more tagging devices 255. For example, multiple tagging devices 255 may provide, to application server 235 (e.g., based on input from respective users), tag information associated with a single item of media content (e.g., a television program, a movie, etc.), and advertisement device 245 may receive the tag information associated with each of the multiple tagging devices 255 (e.g., such that advertisement device 245 stores or has access to tag information associated with multiple tags associated with the media content).

As further shown in FIG. 6, process 600 may include determining advertisement information, associated with the media content, based on the tag information (block 620). For example, advertisement device 245 may determine advertisement information, associated with the media content, based on the tag information. In some implementations, advertisement device 245 may determine the advertisement information after advertisement device 245 receives the tag information. Additionally, or alternatively, advertisement device 245 may determine the advertisement information when advertisement device 245 receives an indication that advertisement device 245 is to determine the advertisement information.

Advertisement information may include information associated with an advertisement to be played along with media content and/or a media content clip associated with the media content. For example, the advertisement information may include information that identifies an advertisement (e.g., an advertisement name, an advertisement identifier, a URL associated with the advertisement, etc.), advertisement break information that indicates a manner in which the advertisement is to be played with (e.g., before, after, during, etc.) the media content and/or the media content clip, or another type of information.

In some implementations, advertisement device 245 may determine advertisement information by selecting an advertisement to be played with the media content and/or the media content clip. For example, advertisement device 245 may store or have access to a group of advertisements (e.g., commercials, videos, images, etc.) that may be played (e.g., via CDN device 240), via viewing device 260, with the media content and/or a media content clip associated with the media content. In some implementations, advertisement device 245 may also store subject information associated with the advertisements (e.g., information that identifies subject matter of the advertisements, brand names associated with the advertisements, keywords associated with the advertisements, etc.). Here, advertisement device 245 may select the advertisement based on the tag information and the stored information.

As an example, assume that tag information, associated with the media content, includes a user comment associated with a wristwatch shown in the media content (e.g., "Cool watch!"). Here, based on the tag information, associated with the media content, and the subject information, associated with the group of advertisements, advertisement device 245 may select the advertisement as an advertisement associated with a watch brand (e.g., such that the watch brand advertisement may be played with the media content and/or a media content clip associated with the media content). In some implementations, advertisement device 245 may select the advertisement based on processing and/or analyzing tag information associated with multiple tagging devices 255. Additionally, or alternatively, advertisement device 245 may select multiple advertisements to be played with the media content and/or the media content clip (e.g., at different times during playback of the media content and/or the media content clip).

Additionally, or alternatively, advertisement device 245 may select the advertisement based on metadata information associated with the media content (e.g., provided by application server 235). For example, advertisement device 245 may identify an advertisement based on a title of the media content (e.g., an advertisement for a restaurant may be selected for a television program that includes "chef" in the title), a subject of the media content (e.g., a clothing advertisement may be selected for a documentary about a fashion designer), a description of the media content (e.g., a car advertisement may be selected for a movie about an auto race), or the like.

Additionally, or alternatively, advertisement device 245 may select the advertisement in another manner, such as by selecting (e.g., randomly, in a particular order, based on a priority, etc.) the advertisement from the group of advertisements stored or accessible by advertisement device 245. For example, advertisement device 245 may be configured to determine transcription information (e.g., a transcription of audio included in the media content), associated with the media content, and use one or more words, included in the transcription information, as keywords for selecting the advertisement. As another example, advertisement device 245 may analyzed the content of the media content (e.g., object recognition) to identify keywords that may be used to select the advertisement. In some implementations, advertisement device 245 may perform one or more of the above techniques in order to determine a set of scores, and may select the advertisement based on a (e.g., weighted) combination of the scores (e.g., where the tag information may be given a highest weight).

In some implementations, advertisement device 245 may also determine, based on the tag information, advertisement information that includes advertisement break information that indicates the manner in which the selected advertisement is to be played with the media content and/or the media content clip (e.g., 2 minutes after the media content playback begins, before the media content clip is played, halfway through the media content clip, etc.). For example, assume that advertisement device 245 receives tag information associated with a particular time during the media content (e.g., a user comment including "Nice car!" at 30 seconds into playback of the media content). Here, advertisement device 245 may determine advertisement break information indicating that a selected advertisement (e.g., a car advertisement) is to be played at a particular time during playback of the media content (e.g., 40 seconds into playback of the media content, shortly after the car is shown in the media content).

As another example, assume that advertisement device 245 receives tag information associated with multiple tagging devices 255, and that the tag information includes tags clustered around a particular time and/or time period during playback of the media content (e.g., 20 user comments between a tenth and eleventh minute of the playback of the media content). Here, advertisement device 245 may determine advertisement break information indicating that the selected advertisement is to be played between the tenth and eleventh minute of playback of the media content (e.g., since the tag information indicates that many users view the media content between the tenth and eleventh minute). Alternatively, advertisement device 245 may determine advertisement break information indicating that the selected advertisement is not to be played between the tenth and eleventh minute of playback of the media content (e.g., in order to avoid interrupting viewing between the tenth and eleventh minute).

In some implementations, advertisement device 245 may determine the advertisement information based on an advertisement algorithm stored or accessible by advertisement device 245. For example, advertisement device 245 may provide, as input to the advertisement algorithm, tag information associated with the media content, and may receive, as an output, information that may be used to select the advertisement and/or information that identifies the advertisement and/or the advertisement break information. Here, the output of the advertisement algorithm may include a score for a group of advertisements. Advertisement device 245 may then selected a highest scoring advertisement, of the group of advertisements, or select an advertisement from a highest scoring group of advertisements (e.g., a group of top three highest scoring advertisements).

Additionally, or alternatively, advertisement device 245 may determine the advertisement information in another manner, such as based on input from a user (e.g., an administrator) of advertisement device 245.

As further shown in FIG. 6, process 600 may include providing the advertisement information (block 630). For example, advertisement device 245 may provide the advertisement information. In some implementations, advertisement device 245 may provide the advertisement information after advertisement device 245 determines the advertisement information. Additionally, or alternatively, advertisement device 245 may provide the advertisement information when advertisement device 245 receives an indication that advertisement device 245 is to provide the advertisement information.

In some implementations, advertisement device 245 may provide the advertisement information to application server 235. For example, advertisement device 245 may provide information that identifies the media content, information that identifies the advertisement, and the advertisement break information to application server 235 (e.g., such that application server 235 may provide the advertisement information at a later time). For example, in some implementations, application server 235 may provide the advertisement information to viewing device 260. As a particular example, assume that viewing device 260 receives an indication (e.g., based on user input via the media content application) that viewing device 260 is to play the media content. Here, application server 235 may provide, to viewing device 260, the advertisement information associated with the media content (e.g., such that viewing device 260 plays the advertisement with the media content in accordance with advertisement information). In this way, an advertisement may be dynamically identified and/or played with the media content based on tag information associated with the media content. In some implementations, application server 235 may also provide, to viewing device 260, the tag information, associated with the media content, such that one or more tags (e.g., provided by one or more tagging devices 255) may be played during playback of the media content.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
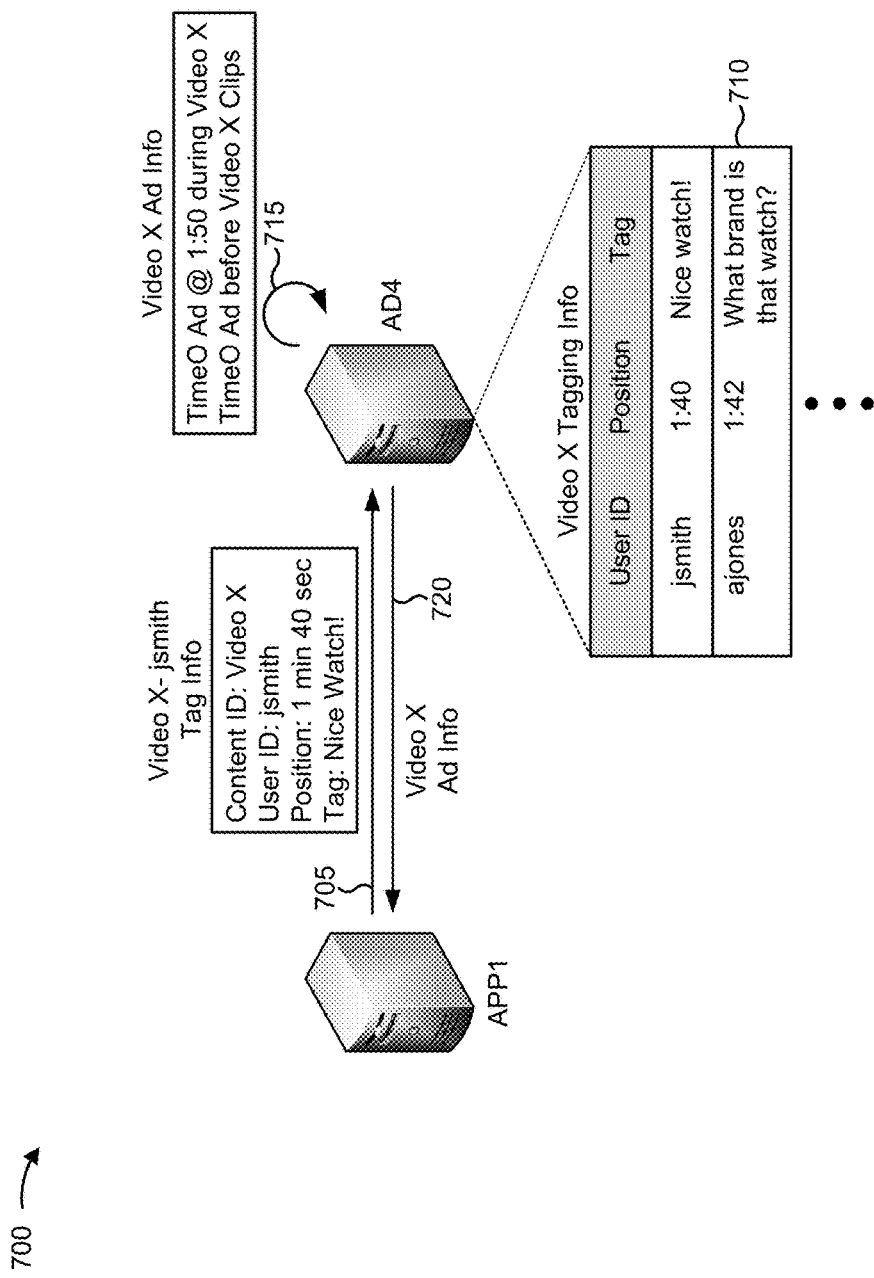
FIG. 7 is a diagram of an example implementation relating to the example process shown in FIG. 6.

FIG. 7 is a diagram of an example implementation 700 relating to example process 600 shown in FIG. 6. For the purposes of example implementation 700, assume that application server 235 (e.g., APP1), associated with a media content application, has received (e.g., from multiple tagging devices 255) tag information associated with media content (e.g., Video X). Further, assume that advertisement device 245 (e.g., AD4), stores or has access to a group of advertisements and subject information associated with the group of advertisements (e.g., such that AD1 may select an advertisement, of the group of advertisements, based on the subject information).

As shown in FIG. 7, and by reference number 705, APP1 may provide, to AD4, tag information associated with Video X (e.g., provided by UD1 as described in the above example). As shown, the tag information may include information that identifies Video X (e.g., Content ID: Video X), information that identifies a user associated with the tag information (e.g., User ID: jsmith), timing information associated with the tag (e.g., 1 min 40 sec), and the user created tag (e.g., Tag: "Nice Watch!"). As shown by reference number 710, AD4 may store the tag information. As shown, AD4 may also store other tag information (e.g., provided by another tagging device 255) associated with Video X (e.g., User ID: ajones, Position: 1 min 42 sec, Tag: "What brand is that watch?"). For the purposes of example implementation 700, assume that AD4 is configured to determine advertisement information, associated with Video X, when AD4 receives tag information associated with Video X (e.g., such that the advertisement information may be updated when tag information for Video X is received).

As shown by reference number 715, AD4 may determine advertisement information indicating that a watch advertisement is to be played with Video X and/or a Video X clip. For example, since both tags associated with Video X include the word "watch," AD4 may select (e.g., based on subject information associated with the group of advertisements stored or accessible by AD4) a watch advertisement (e.g., a TimeO ad) to be played with Video X. As further shown, AD4 may also determine (e.g., based on the timing information included in the tag information) advertisement break information indicating that that the TimeO ad is to be played one minute and fifty seconds into playback of Video X, and may determine (e.g., based on a default configuration) that the TimeO ad is to be played before any Video X clip. As shown by reference number 720, AD4 may provide the Video X advertisement information to APP1 (e.g., such that APP1 may provide the Video X advertisement information at a later time). In this way, Video X advertisement information, associated with advertisements to be played with Video X and/or a Video X clip may be dynamically determined based on tag information associated with Video X.

As indicated above, FIG. 7 is provided merely as an example. Other examples are possible and may differ from what was described with regard to FIG. 7.

Figure 8:
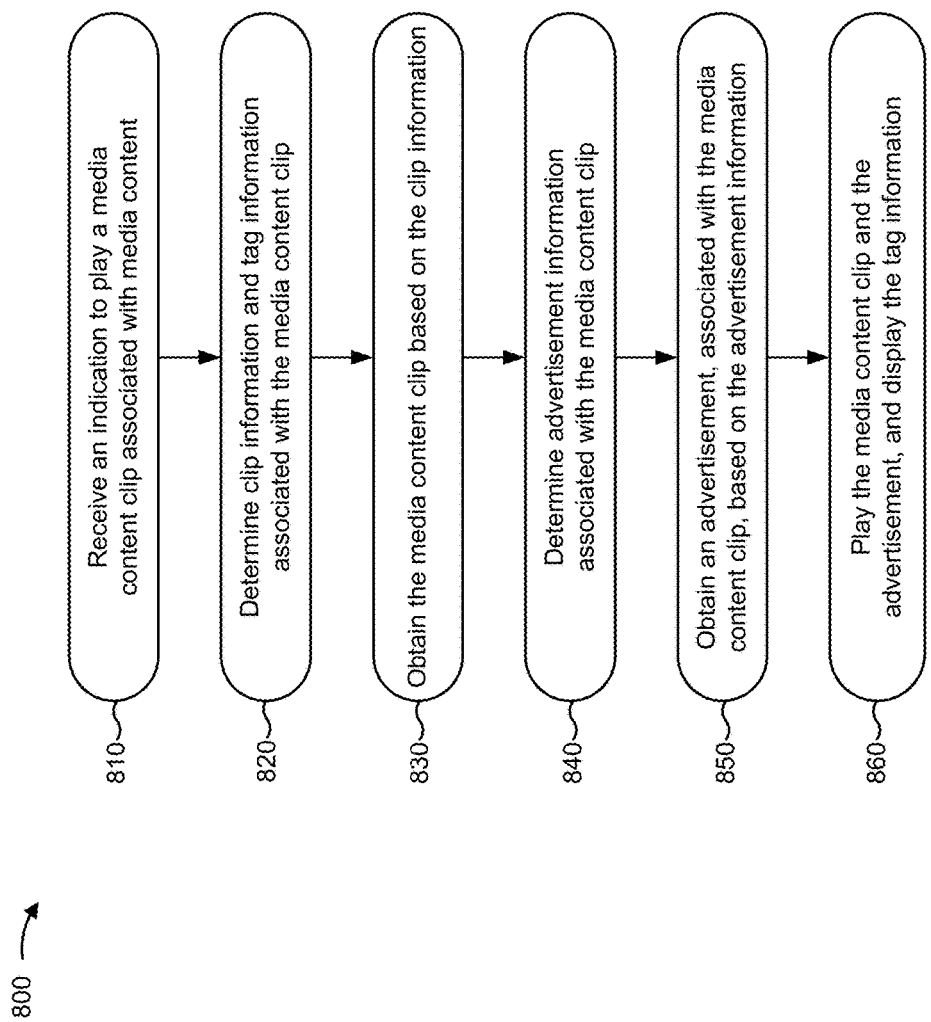
FIG. 8 is a flow chart of an example process for playing a media content clip and an advertisement associated with the media content clip.

FIG. 8 is a flow chart of an example process 800 for playing a media content clip and an advertisement associated with the media content clip. In some implementations, one or more process blocks of FIG. 8 may be performed by viewing device 260. In some implementations, one or more process blocks of FIG. 8 may be performed by another device or a set of devices separate from or including viewing device 260, such as by another device included in environment 200.

As shown in FIG. 8, process 800 may include receiving an indication to play a media content clip associated with media content (block 810). For example, viewing device 260 may receive an indication to play a media content clip associated with media content. In some implementations, viewing device 260 may receive the indication when a user provides the indication (e.g., via user input). Additionally, or alternatively, viewing device 260 may (e.g., automatically) receive the indication based on a configuration of viewing device 260.

In some implementations, viewing device 260 may receive the indication via a social media application (e.g., hosted by social media device 250). For example, viewing device 260 may provide, for display via a user interface associated with a social media application, tag information (e.g., provided by tagging device 255) associated with the media content clip, as described above. Here, viewing device 260 may receive the indication via the social media application based on the user indicating (e.g., by selecting a link associated with the tag information, a button associated with the tag information, etc.) that the user wishes to view the media content clip associated with the tag information.

As further shown in FIG. 8, process 800 may include determining clip information and tag information associated with the media content clip (block 820). For example, viewing device 260 may determine clip information and tag information associated with the media content clip. In some implementations, viewing device 260 may determine the clip information and the tag information when viewing device 260 receives the indication to play the media content clip.

In some implementations, viewing device 260 may determine the clip information based on information stored by application server 235. For example, viewing device 260, upon receiving the indication to play the media content clip, may request, from application server 235, clip information that describes the media content clip corresponding to the tag viewed by the user of viewing device 260. Here, viewing device 260 may provide information that identifies the media content, a user that created the clip, timing information associated with the tag, or the like. Application server 235 may identify (e.g., based on information stored by application server 235) clip information corresponding to the tag accessed by the user of viewing device 260, and may provide the clip information accordingly. In some implementations, viewing device 260 may obtain the media content clip based on the clip information, as described below.

In some implementations, viewing device 260 may determine tag information, associated with the media content clip, based on information stored by application server 235. For example, as described above, application server 235 may store tag information (e.g., provided by one or more tagging devices 255) associated with the media content.

Here, viewing device 260 may request the tag information (e.g., in a manner similar to that described above with regard to the clip information) and application server 235 may identify (e.g., based on tag information stored by application server 235) the tag information, and may provide the tag information accordingly. In some implementations, viewing device 260 may determine tag information corresponding to the media content clip. For example, viewing device 260 may request tag information for all tags (e.g., stored by application server 235) with timing information corresponding to tags between the start time of the media content clip and the end time of the media content clip.

As further shown in FIG. 8, process 800 may include obtaining the media content clip (block 830). For example, viewing device 260 may obtain the media content clip. In some implementations, viewing device 260 may obtain the media content clip after viewing device 260 receives the indication to play the media content clip. Additionally, or alternatively, viewing device 260 may obtain the media content clip after viewing device 260 determines the clip information associated with the media content clip.

In some implementations, viewing device 260 may obtain the media content clip based on the clip information. For example, the clip information may include information that identifies information that identifies the media content, information that identifies a start time of the media content clip, and information that identifies an end time of the media content clip. Here, viewing device 260 may send, to CDN device 240, a request to provide the media content clip described by the clip information. CDN device 240 may receive the request, and may provide the media content clip (e.g., one or more chunks of the media content) corresponding to the clip information. In this way, viewing device 260 may obtain the media content clip based on the clip information (e.g., rather than obtaining the media content in its entirety).

As further shown in FIG. 8, process 800 may include determining advertisement information associated with the media content clip (block 840). For example, viewing device 260 may determine advertisement information associated with the media content clip. In some implementations, viewing device 260 may determine the advertisement information when viewing device 260 receives the indication to play the media content clip.

In some implementations, viewing device 260 may determine the advertisement information, associated with the media content clip, based on advertisement information associated with the media content. For example, advertisement device 245 may determine, in the manner described above, advertisement information associated with the media content. Here, as described above, the advertisement information may include information that identifies an advertisement that is to be played along with the media content clip and advertisement break information indicating when the advertisement information is to be played (e.g., before the media content clip, at a particular time during play of the media content clip, etc.). In some implementations, viewing device 260 may request the advertisement information, associated with the media content, and application server 235 and/or advertisement device 245 may provide the advertisement information to viewing device 260.

As further shown in FIG. 8, process 800 may include obtaining an advertisement, associated with the media content clip, based on the advertisement information (block 850). For example, viewing device 260 may obtain an advertisement, associated with the media content clip, based on the advertisement information. In some implementations, viewing device 260 may obtain the advertisement after viewing device 260 determines the advertisement information associated with the media content clip.

In some implementations, viewing device 260 may obtain the advertisement based on the advertisement information. For example, application server 235 may provide advertisement information that includes information (e.g., a URL) that identifies a location at which the advertisement is stored (e.g., by CDN device 240). Here, upon identifying the advertisement based on the advertisement information, viewing device 260 may request (e.g., from CDN device 240) the advertisement based on the location information, and CDN device 240 may provide the advertisement accordingly.

As further shown in FIG. 8, process 800 may include playing the media content clip, the advertisement, and displaying the tag information (block 860). For example, viewing device 260 may play the media content clip, the advertisement, and display the tag information. In some implementations, viewing device 260 may play the media content clip, the advertisement, and display the tag information after viewing device 260 obtains the media content clip, the advertisement, and the tag information. Additionally, or alternatively, viewing device 260 may play the media content clip, the advertisement, and display the tag information when viewing device 260 receives an indication that viewing device 260 is to play the media content clip, the advertisement, and display the tag information.

In some implementations, viewing device 260 may play the advertisement with the media content clip in accordance with the advertisement information. For example, the advertisement information may indicate that the advertisement is to be played before the media content clip, after the media content clip, during the media content clip at a particular time, or the like, and viewing device 260 may play the advertisement accordingly.

Additionally, or alternatively, viewing device 260 may provide the tag information for display with the media content clip. For example, the tag information may include timing information associated with one or more user created tags that are to be displayed with the media content clip, and viewing device 260 may provide the tag information for display accordingly (e.g., such that the user created tags display at respective times during display of the media content clip).

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
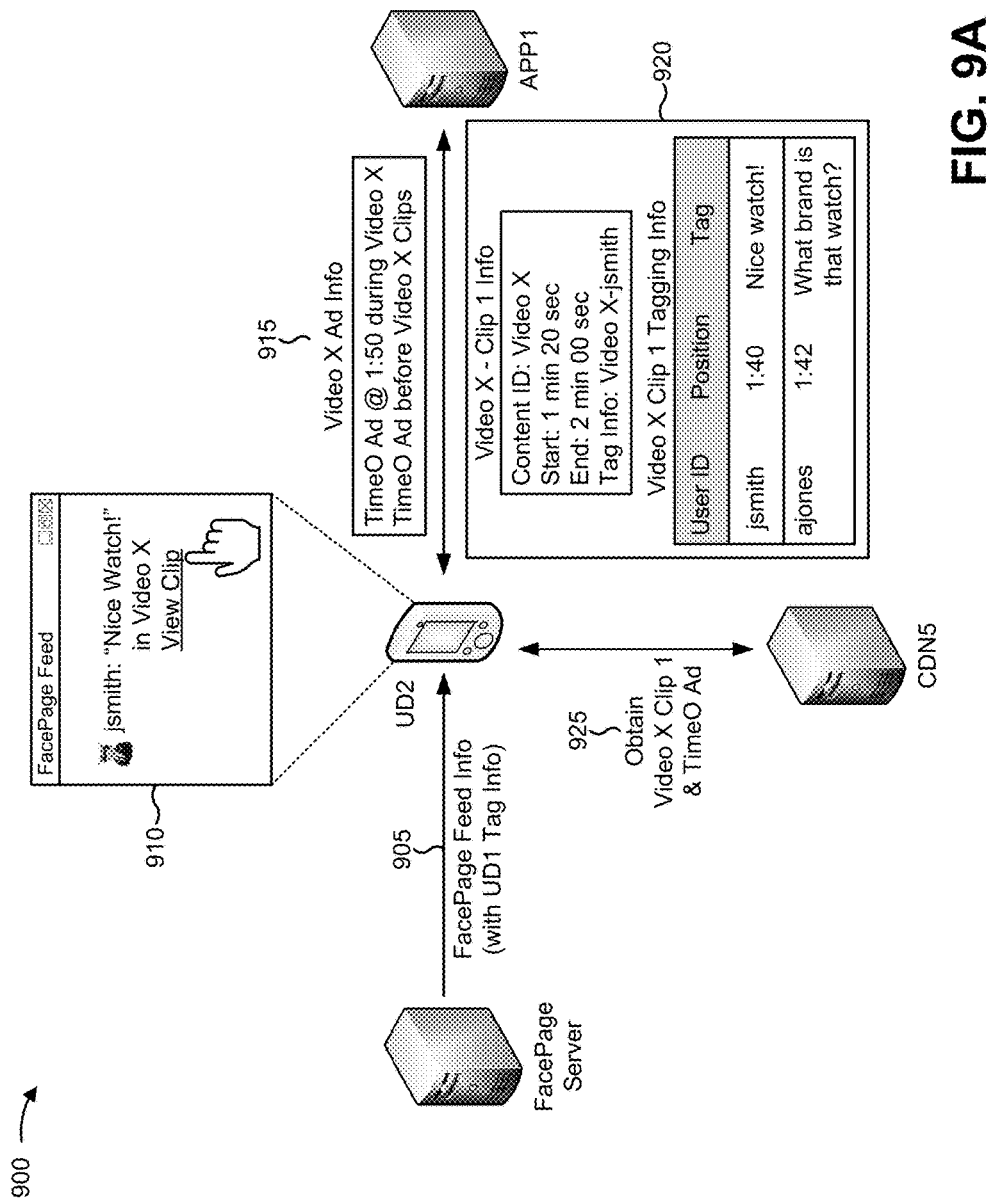
FIGS. 9A and 9B are diagrams of an example implementation relating to the example process shown in FIG. 8.
Figure 9B:
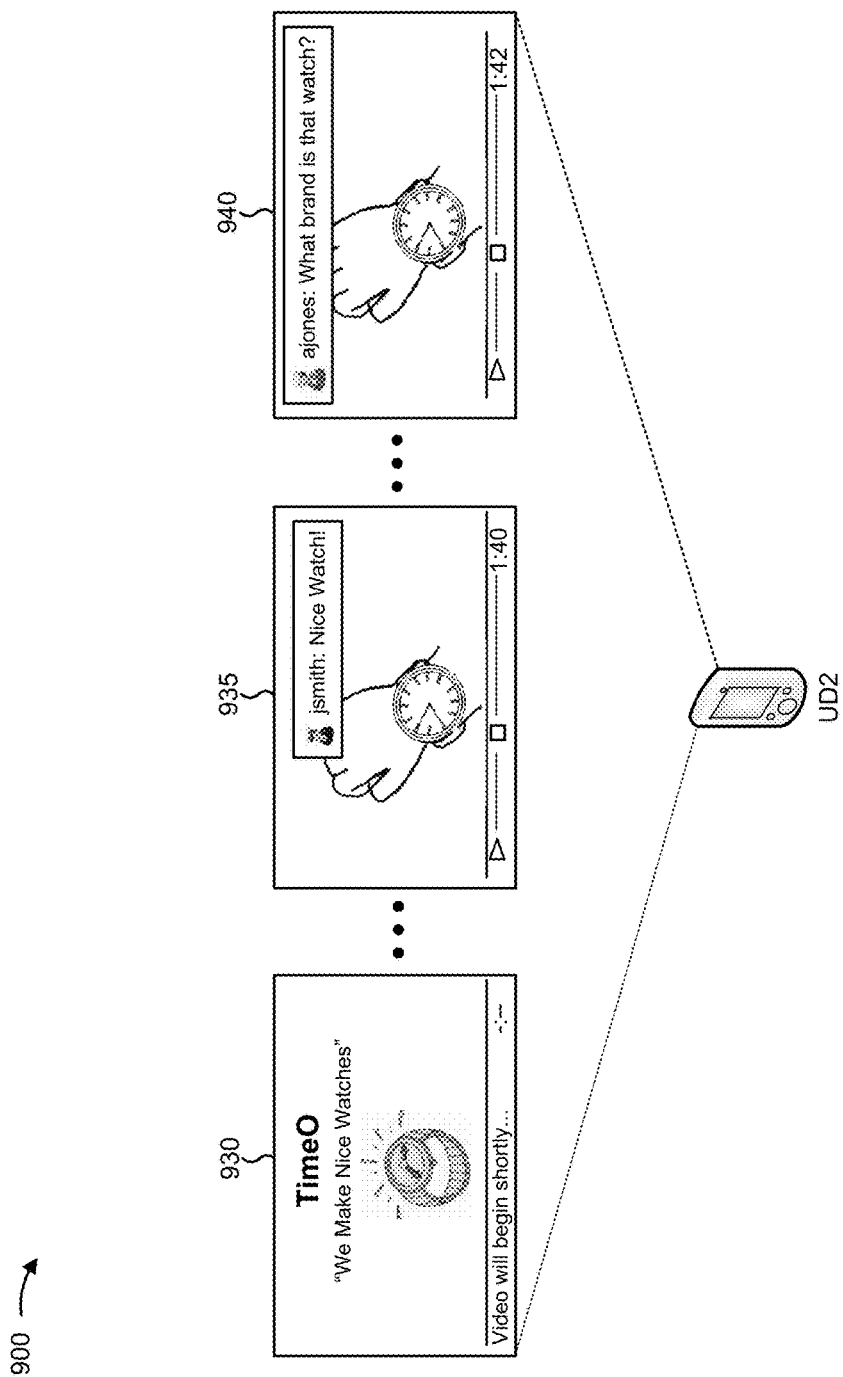

FIGS. 9A and 9B are diagrams of an example implementation 900 relating to example process 800 shown in FIG. 8. For the purposes of example implementation 900, assume that application server 235 (e.g., APP1) stores advertisement information and tag information (e.g., provided by UD1 as described above) associated with an item of media content (e.g., Video X). Further, assume that the tag information has been shared via a social media application (e.g., FacePage) hosted by social media server 250 (e.g., FacePage server) and the APP1 stores clip information for a media content clip (e.g., Video X Clip 1) associated with the tag information. Finally, assume that viewing device 260 (e.g., UD2) has received an indication to play a FacePage feed that may include tag information provided by other FacePage users.

As shown in FIG. 9A, and by reference number 905, the FacePage server may provide, to UD2, FacePage feed information that includes the tag information associated with UD1. As shown by reference number 910, UD2 may provide, for display, the tag information such that the user of UD2 may view the tag information via the FacePage feed. As shown, the user of UD2 may indicate (e.g., by selecting a View Clip link) that the user wishes to view Video X Clip 1 associated with the tag information.

As shown by reference number 915, UD2 may request and receive (e.g., from APP1) advertisement information associated with Video X. As shown, the advertisement information indicates that a TimeO advertisement is to be played before any clip of Video X. As shown by reference number 920, UD2 may request and receive (e.g., from APP1) clip information associated with the tag information associated with the tag information. As shown, the clip information may include information that identifies Video X (e.g., Content ID: Video X), a start time associated with Video X Clip 1 (e.g., Start: 1 min 20 sec), an end time associated with Video X Clip 1 (e.g., End: 2 min 00 sec), and information indicating an association with the tag information (e.g., Tag Info: Video X-jsmith). As further shown, UD2 may also request and receive tag information associated with Video X Clip 1 (e.g., tag information corresponding to tags between a start time and an end time of Video X Clip 1). As shown, the tag information may include the tag information posted via the FacePage feed, as well as tag information provided by a different user (e.g., User ID: ajones, Position: 1:42, Tag: What brand is that watch?). As shown by reference number 925, UD2 may, based on the advertisement information and the clip information, Video X Clip 1 and the TimeO advertisement from CDN device 240 (e.g., CDN5).

As shown in FIG. 9B, and by reference number 930, UD2 may play the TimeO advertisement before playing Video X Clip 1. As shown by reference numbers 935 and 940, and after the TimeO advertisement finishes, UD2 may play Video X Clip 1. As shown, UD2 may also provide the tag information at appropriate times (e.g., UD2 may display the tag associated with jsmith at a time during Video X Clip 1 that corresponds to one minute and forty seconds of Video X, UD2 may display the tag associated with ajones at a time during Video X Clip 1 that corresponds to one minute and forty-two seconds of Video X).

As indicated above, FIGS. 9A and 9B is provided merely as an example. Other examples are possible and may differ from what was described with regard to FIGS. 9A and 9B.

Implementations described herein may allow a user to provide a tag, associated with media content, such that the tag and/or a media content clip (e.g., associated with the tag) may be viewed by other users via a social media application. Moreover, implementations described herein may allow an advertisement to be identified and played with the media content and/or the media content clip based on information associated with the tag (e.g., such that the advertisement may be dynamically identified and played based on the information associated with the tag) and/or based on content of the media content and/or the media content clip.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
   a first server device to:
   receive, from a first user device, tag information associated with media content,
   the tag information including:
   a tag associated with the media content,
   information that identifies a social media application via which the tag is to be provided, and
   a tag time associated with the tag;
   generate clip information based on the tag information,
   the clip information including information associated with:
   a title of the media content,
   a subject of the media content, and
   a description of the media content,
   the clip information including information that identifies a start time for a media content clip, associated with the media content, and information that identifies an end time for the media content clip associated with the media content,
   the media content clip being a portion of the media content between the start time and the end time, and
   the tag time being between the start time and the end time;
   provide the tag information to a second server device and a third server device;
   provide the clip information to the second server device;
   receive, from the second server device, advertisement information determined, by the second server device, based on the tag information and the clip information,
   the advertisement information including information that identifies an advertisement to be displayed with the media content clip, and
   the advertisement information including information indicating a manner in which the advertisement is to be displayed with the media content clip;
   receive, from the third server device, an indication that the media content clip is to be provided for display to a second user device,
   the tag information permitting the third server device to provide the tag information for display via the social media application identified in the tag information, and receive, from the second user device, the indication that the media content clip is to be provided for display to the second user device, the indication being received via the social media application;
   provide, to the second user device and based on receiving the indication, the advertisement information and the clip information such that the advertisement and the media content clip are provided for display to the second user device in accordance with the advertisement information; and
   receive, from the second user device and based on providing the advertisement information and the media content clip for display, another tag associated with the media content clip.

2. The system of claim 1, where the first server device is further to:
   determine subject information associated with a group of advertisements, the group of advertisements including the advertisement;

compare the tag information and the subject information; and identify the advertisement based on comparing the tag information and the subject information.

3. The system of claim 1, where the first server device is further to:

determine other tag information associated with the media content, the other tag information including information, associated with the media content, received at a time before the tag information is received; and determine the advertisement information based on the tag information and the other tag information.

4. The system of claim 1, where the first server device is further to:

determine the start time of the media content clip by adding a first default amount of time to the tag time; and determine the end time of the media content clip by subtracting a second default amount of time from the tag time.

5. The system of claim 1, where the first server device is further to:

receive, from the second server device, an indication that the tag information is to be provided for display via the social media application identified in the tag information; and provide, to the second user device, the tag information based on receiving the indication that the tag information is to be provided for display via the social media application identified in the tag information.

6. The system of claim 1, where the first server device is further to:

provide the tag information such that the tag is provided for display to the second user device with the media content clip, the tag being provided for display to the second user device based on the tag time included in the tag information.

7. The system of claim 1, where the first server device is further to:

cause the media content to be provided for display to a third user device; and receive the tag information based on causing the media content to be provided for display to the third user device, the tag information being based on user input from the third user device.

8. A method, comprising:

receiving, by a first server device and from a first user device, tag information associated with media content, the tag information including:

a tag associated with the media content, information that identifies a social media application via which the tag is to be provided, and a tag time associated with the tag;

generating, by the first server device, clip information based on the tag information, the clip information including information associated with:

a title of the media content, a subject of the media content, and a description of the media content, the clip information including information that identifies a start time for a media content clip, associated with the media content, and information that identifies an end time for the media content clip associated with the media content, the media content clip being a portion of the media content, between the start time and the end time, and the tag time being between the start time and the end time;

providing, by the first server device, the tag information to a second server device and a third server device;

providing, by the first server device, the clip information to the second server device;

receiving, by the first server device and from the second server device, advertisement information determined, by the second server device, based on the tag information and the clip information, the advertisement information including information that identifies an advertisement to be displayed with the media content clip, and the advertisement information including information indicating a manner in which the advertisement is to be displayed with the media content clip;

receiving, by the first server device and from the third server device, an indication that the media content clip is to be provided for display to a second user device, the tag information permitting the third server device to provide the tag information for display via the social media application identified in the tag information, and receive, from the second user device, the indication that the media content clip is to be provided for display to the second user device, the indication being received via the social media application;

providing, by the first server device, to the second user device, and based on receiving the indication, the advertisement information and the clip information, such that the advertisement and the media content clip are provided for display to the second user device in accordance with the advertisement information; and receiving, by the first server device, from the second user device, and based on providing the advertisement information and the media content clip for display, another tag associated with the media content clip.

9. The method of claim 8, further comprising:

determining subject information associated with a group of advertisements, the group of advertisements including the advertisement;

comparing the tag information and the subject information; and selecting the advertisement based on comparing the tag information and the subject information.

10. The method of claim 8, further comprising:

determining other tag information associated with the media content, the other tag information including information, associated with the media content, received at a time before the tag information is received; and determining the advertisement information based on the other tag information.

11. The method of claim 8, further comprising:

determining the start time of the media content clip by increasing the tag time by a first amount of time; and determining the end time of the media content clip by decreasing the tag time by a second amount of time.

12. The method of claim 8, further comprising:
receiving, from the second server device, an indication that the tag information is to be provided for display via the social media application identified in the tag information; and
providing, to the second user device, the tag information based on receiving the indication that the tag information is to be provided for display via the social media application identified in the tag information.

13. The method of claim 8, further comprising:
providing the tag information such that the tag is provided for display to the second user device with the media content clip,
the tag being provided for display to the second user device based on the tag time included in the tag information.

14. The method of claim 8, further comprising:
causing the media content to be displayed by a third user device; and
receiving the tag information based on causing the media content to be displayed by the third user device,
the tag information being based on user input from the third user device.

15. A first server device, comprising:
a memory to store instructions; and
one or more processors, to execute the instructions in the memory, to:
  receive, from a first user device, tag information associated with media content,
    the tag information including:
      a tag associated with the media content,
      information that identifies a social media application via which the tag is to be provided, and
      a tag time associated with the tag;
  generate clip information based on the tag information,
    the clip information including information associated with:
      a title of the media content,
      a subject of the media content, and
      a description of the media content,
    the clip information including information that identifies a start time for a media content clip, associated with the media content, and information that identifies an end time for the media content clip associated with the media content,
      the media content clip being a portion of the media content between the start time and the end time, and
      the tag time being between the start time and the end time;
  provide the tag information to a second server device and a third server device;
  provide the clip information to the second server device;
  receive, from the second server device, advertisement information, determined by the second server device, based on the tag information and the clip information,
    the advertisement information including information that identifies an advertisement to be displayed with the media content clip, and
    the advertisement information including information that identifies a manner in which the advertisement is to be displayed with the media content clip;
  receive, from the third server device, an indication that the media content clip is to be provided for display to a second user device,
    the tag information permitting the third server device to provide the tag information for display via the social media application identified in the tag information, and receive, from the second user device, the indication that the media content clip is to be provided for display to the second user device,
      the indication being received via the social media application;
  provide, to the second user device and based on receiving the indication, the advertisement information and the clip information such that the advertisement and the media content clip are provided for display to the second user device in accordance with the advertisement information; and
  receive, from the second user device and based on providing the advertisement information and the media content clip for display, another tag associated with the media content clip.

16. The first server device of claim 15, where the one or more processors are further to:
determine subject information associated with a group of advertisements,
  the group of advertisements including the advertisement;
compare the tag information and the subject information; and
identify the advertisement based on comparing the tag information and the subject information.

17. The first server device of claim 15, where the one or more processors are further to:
determine the manner in which the advertisement is to be provided for display with the media content clip, based on the tag time.

18. The first server device of claim 15, where the manner in which the advertisement is to be provided for display with the media content clip, includes at least one of:
information indicating that the advertisement is to be provided for display before display of the media content clip;
information indicating that the advertisement is to be provided for display after display of the media content clip; or
information indicating that the advertisement is to be provided for display at one or more particular times during display of the media content clip.

19. The first server device of claim 15, where the one or more processors are further to:
provide the tag information as an input to an advertisement algorithm associated with determining the advertisement information; and
select the advertisement information based on an output of the advertisement algorithm.

20. The first server device of claim 15, where the one or more processors are further to:
receive additional tag information associated with the media content; and
determine updated advertisement information based on the tag information and the additional tag information.

* * * * *